US012567530B2

(12) United States Patent
Virtanen et al.

(10) Patent No.: US 12,567,530 B2
(45) Date of Patent: Mar. 3, 2026

(54) INTERMEDIATE YOKE FOR A POWER TRANSFORMER AND POWER TRANSFORMER

(71) Applicant: Hitachi Energy Ltd, Zürich (CH)

(72) Inventors: Esa Virtanen, Vaasa (FI); Atso Jussila, Vaasa (FI); Jaakko Ketola, Vaasa (FI); Karita Forss, Vaasa (FI)

(73) Assignee: Hitachi Energy Ltd, Zurich (CH)

( * ) Notice: Subject to any disclaimer, the term of this patent is extended or adjusted under 35 U.S.C. 154(b) by 1418 days.

(21) Appl. No.: 17/053,485

(22) PCT Filed: May 6, 2019

(86) PCT No.: PCT/EP2019/061547
§ 371 (c)(1),
(2) Date: Nov. 6, 2020

(87) PCT Pub. No.: WO2019/215084
PCT Pub. Date: Nov. 14, 2019

(65) Prior Publication Data

US 2021/0134512 A1 May 6, 2021

(30) Foreign Application Priority Data

May 7, 2018 (FI) ..................................... 20187067

(51) Int. Cl.
*H01F 27/245* (2006.01)
*H01F 3/02* (2006.01)
(Continued)

(52) U.S. Cl.
CPC ............. *H01F 27/245* (2013.01); *H01F 3/02* (2013.01); *H01F 27/263* (2013.01); *H01F 27/324* (2013.01); *H01F 30/12* (2013.01)

(58) Field of Classification Search
CPC ........ H01F 27/245; H01F 3/02; H01F 27/263; H01F 27/324; H01F 30/12; H01F 41/0233; H01F 27/26; H01F 27/34
See application file for complete search history.

(56) References Cited

U.S. PATENT DOCUMENTS 3,760,316 A * 9/1973 Czewski .............. H01F 27/263 336/210
4,496,925 A 1/1985 Geschka
(Continued)

FOREIGN PATENT DOCUMENTS

CN 2651908 Y 10/2004
CN 102360792 A 2/2012
(Continued)

OTHER PUBLICATIONS

International Search Report and Written Opinion of the International Searching Authority, PCT/EP2019/061547, mailed Jul. 4, 2019, 14 pages.
(Continued)

*Primary Examiner* — Tuyen T Nguyen
(74) *Attorney, Agent, or Firm* — Sage Patent Group

(57) ABSTRACT

An intermediate yoke for a power transformer with at least three legs, the intermediate yoke including a plurality of pre-stacked intermediate yoke modules for being fitted between the adjacent legs, laminated transformer sheets of an intermediate yoke module bound by stud bolts or other tie rods, the intermediate yoke including plurality of interconnection plates including at the at least one transformer sheet for binding the pre-stacked intermediate yoke modules together by both sides of the intermediate yoke module.

20 Claims, 1 Drawing Sheet

(51) Int. Cl.

| | |
|---|---|
| ***H01F 27/26*** | (2006.01) |
| ***H01F 27/32*** | (2006.01) |
| ***H01F 30/12*** | (2006.01) |

(56) References Cited

U.S. PATENT DOCUMENTS 4,518,942 A * 5/1985 Geschka ............... H01F 27/263 29/609
2002/0158744 A1* 10/2002 Ngo ...................... H01F 27/306 336/234

FOREIGN PATENT DOCUMENTS

| | | | | |
|---|---|---|---|---|
| CN | 202258697 | U | | 5/2012 |
| CN | 202258698 | U | * | 5/2012 |
| CN | 202307452 | U | * | 7/2012 |
| CN | 205122369 | U | | 3/2016 |
| GB | 351367 | A | | 6/1931 |
| JP | H04251903 | A | | 9/1992 |
| JP | H0834158 | B2 | | 3/1996 |
| JP | 2855886 | B2 | | 2/1999 |
| JP | H11135339 | A | | 5/1999 |
| JP | 3620244 | B2 | | 2/2005 |

OTHER PUBLICATIONS

International Preliminary Report on Patentability of the International Preliminary Examining Authority, PCT/EP2019/061547, mailed Jul. 14, 2020, 15 pages.
Finnish Search Report mailed Dec. 3, 2018 for Finnish Patent Application No. 20187067, 2 pages.
Finnish Office Action dated Dec. 10, 2021 for Finnish Patent Application No. 20187067, 9 pages.
Pelicer, Joao Carlos, Jr. et al., "Analysis of Intermediary Yoke for 12-Pulse Transformer Connections," International Conference on Industry Applications, Juiz De Fora, Brazil, Jul. 12, 2017, 6 pages.
First Office Action and Search Report for Chinese Patent Application No. 201980030369.8, mailed Aug. 30, 2023, 5 pages.

* cited by examiner

INTERMEDIATE YOKE FOR A POWER TRANSFORMER AND POWER TRANSFORMER

FIELD

The present invention relates to an intermediate yoke for a power transformer.

BACKGROUND 12-pulse rectification is commonly applied for rectifier transformers used for electrolysis processes. To reduce a problem of $5^{th}$ and $7^{th}$ harmonics, the transformer may be equipped with a 2-tier core construction with an intermediate yoke. An intermediate yoke assembled sheet by sheet extends the lead time for manufacturing a transformer.

SUMMARY

An object of the present invention is to provide an improved arrangement for assembling the intermediate yoke. The object is achieved with an invention, which is defined in the independent claim. Some embodiments are disclosed in the dependent claims.

DRAWINGS

Figure 1:
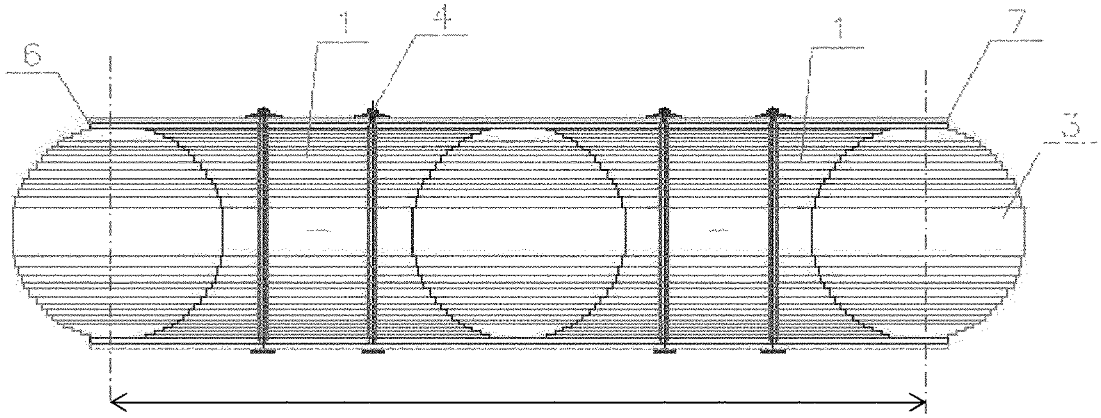
Figure 2:
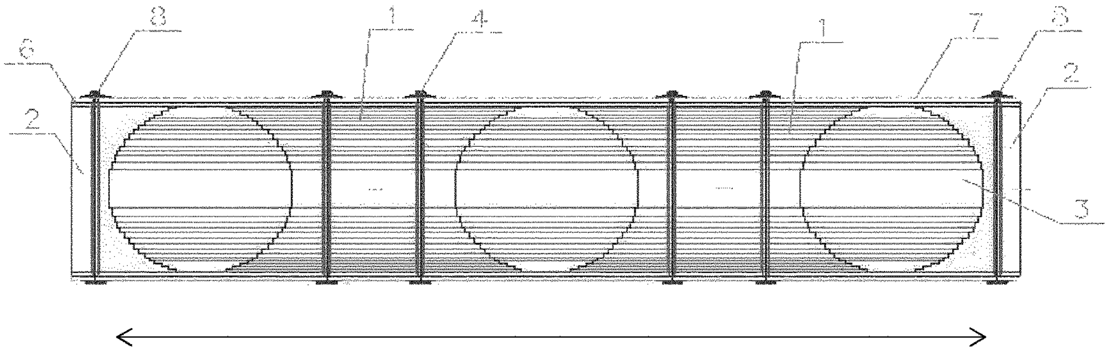

In the following, the invention will be described in greater detail by means of some embodiments with reference to the accompanying drawings, in which FIG. 1 shows a cross-sectional top view of a 3-leg power transformer core with an intermediate yoke;

FIG. 2 shows cross-sectional top view of another embodiment of a 3-leg power transformer core with an intermediate yoke;

DETAILED DESCRIPTION

A power transformer comprises a magnetic core and the windings. Typical transformer core for 3-phase system comprises three legs between the lower and upper yokes. The winding coils are assembled around the legs, the primary winding and for secondary winding coil assembled coaxially with each other. In some cases 5-legs construction is used, with two unwound legs. In 2-tier construction the legs are equipped with two secondary winding coils assembled axially next each other. The intermediate yokes assembled between the legs are axially located between the secondary winding coils. In 3-tier construction the legs are equipped with three secondary winding coils and correspondingly two intermediate yokes are assembled between each adjacent legs.

FIG. 1 shows a cross-sectional view of a 3-leg transformer core comprising an intermediate yoke.

The intermediate yoke module (1) comprises a plurality of lamination sheets cut in such a way that they fit between the adjacent legs (3). The legs (3) comprise a plurality of lamination sheets cut in such a way that the cross-section shape will become advantageously a circle. The circle shape is optional for using a round shape tube of an insulation material for the core of winding coils. Still the cross-section shape of the leg could vary from circle shape.

The stack of lamination sheets is bound by stud bolts (4) or other suitable tie rods as a pre-stacked intermediate yoke module (1).

Further each of the intermediate yoke modules (1) are fixed to each other by at least one interconnection sheet (6) on both side of the intermediate yoke module by the stud bolts (4) or other suitable tie rods. Finally insulation plates (7) are assembled on the top of the interconnection sheets (6) for insulating the both end of the bolts, typically a nut on the other end of the stud bolt (4). A washer made of insulation material may be used instead of insulation plates (7). The stud bolts (4) or other suitable tie rods fix the intermediate modules (1), the interconnection sheets (6) and insulation plates (7) together as one intermediate yoke. The interconnection sheets (6) fix the intermediate modules mechanically but also act as a path especially for the 5th and 7th harmonics for reducing the harmful effect of those.

The interconnection plate (6) preferably extend at the center lines of the outermost legs (3), more preferably to the position where the outermost transformer sheets of the outermost legs (3) extend.

The lead time of transformer manufacturing assembly is reduced by the pre-stacked and intercoupled intermediate yoke modules (1). When the lower coils are assembled there is no need to start time consuming stacking the lamination sheets for the intermediate yoke but the pre-assembled intermediate yoke (1) may be lowered by a crane or a hoist to its final location.

FIG. 2 shows an embodiment of the invention. The construction with intermediate yoke modules (1), the legs (3) and the stud bolts (4) or other suitable tie rods is the same as in FIG. 1) but the interconnection sheets (6) extend over the outermost legs (3) such that they can be fixed by extra stud bolts (8) or other suitable tie rods. The insulation plates (7) may be assembled to the top of the interconnection sheets (6) and extend as long at least pass the stud bolts (8). The stud bolts (8) may be insulated by insulating washers instead of the plate (7).

This construction is mechanically more stable and more effective for catching and reducing the $5^{th}$ and $7^{th}$ harmonics.

It will be obvious to a person skilled in the art that the inventive concept can be implemented in various ways. The invention and its embodiments are not limited to the examples described above but may vary within the scope of the claims.

The invention claimed is:

1. An intermediate yoke of a power transformer with at least three legs, the intermediate yoke comprising:

- a plurality of pre-stacked intermediate yoke modules configured to fit between adjacent legs of the power transformer, at least one intermediate yoke module comprising a plurality of laminated first transformer sheets bound by a first plurality of tie rods; and
- a plurality of interconnection plates comprising at least one second transformer sheet extending at least to centre lines of the outermost legs of the at least three legs to fix the pre-stacked intermediate yoke modules to each other by both sides of the intermediate yoke modules.

2. An intermediate yoke according to claim 1, wherein the interconnection plates are fixed by the first plurality of tie rods binding the plurality of first transformer sheets of the at least one intermediate yoke module.

3. An intermediate yoke according to claim 1, wherein portions of the interconnection plates extend over the outermost legs of the at least three legs of the power transformer past the centre lines of the outermost legs of the at least three legs of the power transformer.

4. An intermediate yoke according to claim 1, wherein the at least one second transformer sheet of each interconnection plate comprises a stack of second transformer sheets.

5. An intermediate yoke according to claim 1, further comprising an insulation plate arranged on a top of the interconnection plates to insulate the first plurality of tie rods.

6. An intermediate yoke according to claim 1, further comprising insulating washers arranged on a top of the interconnection plates to insulate the first plurality of tie rods.

7. The intermediate yoke according to claim 1, wherein the first plurality of tie rods comprises a plurality of stud bolts.

8. A transformer comprising:

at least three legs; and an intermediate yoke comprising:

a plurality of pre-stacked intermediate yoke modules arranged between adjacent legs of the transformer, at least one intermediate yoke module comprising a plurality of laminated first transformer sheets bound by a first plurality of tie rods; and a plurality of interconnection plates comprising at least one second transformer sheet extending at least to centre lines of the outermost legs of the at least three legs to fix the pre-stacked intermediate yoke modules to each other by both sides of the intermediate yoke modules.

9. The transformer according to claim 8, wherein the transformer is equipped with a 2-tier core construction.

10. The transformer according to claim 8, wherein the transformer is equipped with a 3-tier core construction.

11. The transformer according to claim 8, wherein the interconnection plates of the intermediate yoke are fixed by the first plurality of tie rods binding the plurality of first transformer sheets of the at least one intermediate yoke module.

12. The transformer according to claim 8, wherein portions of the interconnection plates of the intermediate yoke extend over the outermost legs of the at least three legs of the power transformer past the centre lines of the outermost legs of the at least three legs of the power transformer.

13. The transformer according to claim 12, further comprising a second plurality of tie rods arranged on opposite sides of the outermost legs of the at least three legs of the power transformer, the second plurality of tie rods fixing the portions of the interconnection plates of the intermediate yoke extend over the outermost legs of the at least three legs of the power transformer to each other.

14. The transformer according to claim 8, wherein the at least one second transformer sheet of each interconnection plate of the intermediate yoke comprises a stack of second transformer sheets.

15. The transformer according to claim 8, the intermediate yoke further comprising an insulation plate arranged on a top of the interconnection plates to insulate the first plurality of tie rods.

16. The transformer according to claim 8, the intermediate yoke further comprising insulating washers arranged on a top of the interconnection plates to insulate the first plurality of tie rods.

17. The transformer according to claim 8, wherein the first plurality of tie rods of the intermediate yoke comprises a plurality of stud bolts.

18. An intermediate yoke according to claim 3, further comprising a second plurality of tie rods arranged on opposite sides of the outermost legs of the at least three legs of the power transformer, the second plurality of tie rods fixing the portions of the interconnection plates of the intermediate yoke extend over the outermost legs of the at least three legs of the power transformer to each other.

19. A transformer comprising:

at least three legs comprising a first outer leg, a second outer leg, and a central leg between the first outer leg and the second outer leg; and an intermediate yoke comprising:

a first pre-stacked intermediate yoke module arranged between the first outer leg and the central leg of the transformer, the first pre-stacked intermediate yoke module comprising a plurality of laminated first transformer sheets;

a second pre-stacked intermediate yoke module arranged between the second outer leg and the central leg of the transformer, the second pre-stacked intermediate yoke module comprising a plurality of laminated second transformer sheets;

a plurality of interconnection plates, the plurality of interconnection plates comprising a first interconnection plate extending at least between a first centre line of the first outer leg and a second centre line of the second outer leg and a second interconnection plate extending at least between the first centre line of the first outer leg and the second centre line of the second outer leg, wherein the central leg, the first pre-stacked intermediate yoke module, and the second pre-stacked intermediate yoke module are arranged between the first interconnection plate and the second interconnection plate;

a first plurality of tie rods binding the first interconnection plate, the first pre-stacked intermediate yoke module, and the second interconnection plate;

a second plurality of tie rods binding the first interconnection plate, the second pre-stacked intermediate yoke module, and the second interconnection plate.

20. The transformer according to claim 19, wherein a first outer portion of the first interconnection plate extends past the first centre line of the first outer leg, wherein a second outer portion of the second interconnection plate extends past the first centre line of the first outer leg, wherein a third outer portion of the first interconnection plate extends past the second centre line of the second outer leg, wherein a fourth outer portion of the second interconnection plate extends past the second centre line of the second outer leg, the transformer further comprising:

a third plurality of tie rods binding the first outer portion of first interconnection plate and the second outer portion of the second interconnection plate;

a fourth plurality of tie rods binding the third outer portion of first interconnection plate and the fourth outer portion of the second interconnection plate.

* * * * *